Jan. 1, 1952  W. F. STREHLOW ET AL  2,580,480
FARM TRACTOR
Filed April 2, 1948  4 Sheets-Sheet 1

Inventors
Walter F. Strehlow
Charles F. O'Harrow
George W. Park
by Kimball S. Wyman
Attorney Inventors
Walter F. Strehlow
Charles T. O'Harrow
George W. Park Jan. 1, 1952 W. F. STREHLOW ET AL 2,580,480
FARM TRACTOR
Filed April 2, 1948 4 Sheets-Sheet 4

Inventors
Walter F. Strehlow
Charles T. O'Harrow
George W. Park
by Kimball Neyman
Attorney Patented Jan. 1, 1952

2,580,480

UNITED STATES PATENT OFFICE 2,580,480

FARM TRACTOR

Walter F. Strehlow and Charles T. O'Harrow, Wauwatosa, and George W. Park, West Allis, Wis., assignors to Allis-Chalmers Manufacturing Company, Milwaukee, Wis., a corporation of Delaware Application April 2, 1948, Serial No. 18,566

14 Claims. (Cl. 180—1)

This invention relates generally to a draft vehicle for agricultural implements, and is more specifically directed toward a vehicle (hereinafter called tractor) particularly suited for mounting the various tools forward of the operator's station on the vehicle and, at least in part, in underslung relation with respect to the forward part of the tractor.

Vegetable farming usually involves raising a variety of crops planted in closely spaced rows on relatively flat land or on the top surface of flat beds separated by a ditch or furrow therebetween. And in order to obtain the most efficient use of the available land, different crops should be planted in rows spaced apart distances conforming with the nature and requirement of each crop. For example, some crops require a row spacing of only ten inches whereas other crops may require a row spacing of twelve, fourteen or more inches. Consequently the mechanical performance of operations such as planting and cultivating vegetable crops necessitates a design and construction of tractor effective to span any desired number of rows of any given spacing. And it is important that the tractor be of light weight inasmuch as the tire width of the wheel must be such as to afford an adequate support for the tractor and yet be narrow enough to travel between closely spaced rows without damaging the plants therein and to travel in the furrows separating crop beds without damaging the side walls thereof.

In addition, the design and construction of the tractor should be such as to afford adequate ground clearance for operatively mounting implements directly beneath the tractor when the latter is straddling one or more furrow separated beds and such as to afford an operator seated on the tractor a practically unrestricted close range view of the implements and plant rows underlying the tractor as well as those disposed laterally thereof. And in this connection, best operating results are obtained when the implements are positioned in the area between and directly behind the front dirigible wheels as the implements closely follow the steering movements of these wheels and as the operator's line of vision including the implements is sufficiently forward to obtain excellent steerability.

In addition, the matter of maneuverability, other than steering, is also important in that even narrow tread tires travel relatively close to the plants in rows spaced apart a distance of only ten inches and it is sometimes desirable to quickly stop or change the speed of travel as the soil or crop conditions change. Consequently it is essential that controls, such as the change speed lever, the clutch pedal and the brake pedals, be readily accessible for operation as desired without interfering with steerability and without requiring the operator to look away from the plant rows and/or tools.

Attainment of the mode of operation aforementioned involves features not present in the design and construction of agricultural tractors heretofore known and used. And in operating these known tractors it is customary, usually because of the operator's inability to simultaneously view all tool rigs at close range, to cultivate with the tools spaced a sufficient distance from the plants to avoid uprooting the plants in the event the crop rows are irregularly aligned or spaced. This results in incomplete cultivation which must be followed up by the tedious and time consuming procedure of hand weeding. Consequently considerable time is required to complete any such operation and as a result labor costs are invariably too high and a lack of labor or time frequently results in crop damage or loss from inability to plant and/or care for a crop at the most opportune time.

It is therefore an object of this invention to provide an improved tractor incorporating features of construction affording material advantages as to maneuverability when viewing crops and tools underlying a forward portion of the tractor frame.

Another object of the present invention is to provide a tractor with improved features of construction and arrangement affording an operator seated on the tractor a practically unrestricted close range view of the ground and of implements underlying the forward portion of the tractor along a line of vision directed sufficiently forward to obtain excellent steerability.

Another object of this invention is to provide a tractor incorporating parts constructed and combined for coaction in an improved manner permitting one or more tools to be mounted thereon in depending underslug relation thereto along a transverse line directly behind and parallel to the front axle structure so as to position the tools for quick response to steering movements of the tractor front wheels.

Another object of the present invention is to provide a tractor incorporating parts constructed and combined so as to minimize the overall height of the tractor and yet afford adequate ground clearance for straddling furrow-separated crop beds with tools mounted on a forward portion of the tractor in underslung relation therebeneath.

Another object of the present invention is to provide an improved tractor structure affording one or more of the features hereinbefore mentioned and which is still light enough in weight to be properly supported on loose soil by narrow tread tires capable of traveling between closely spaced crop rows without damaging the plants therein and/or capable of traveling in the furrows separating crop beds without damaging the side walls thereof.

It is also an object of this invention to provide a tractor including features of improvement as to the construction and combination of parts, all to the end of affording a simplified, compact and durable structure which is relatively inexpensive to manufacture and service.

The advantages inherent in the above stated objects and other advantages will become readily apparent as the disclosure progresses and particularly points out the various features of this invention. And accordingly, the present invention may be considered as comprising the various constructions, combinations, and/or subcombinations of parts as is hereinafter more fully set forth in the detailed description and appended claims, reference being had to the accompanying drawings in which:

Figs. 8–11, inclusive, show some of the tread spacing adjustments afforded by the rear wheel rim and disc connections.

Figure 1:
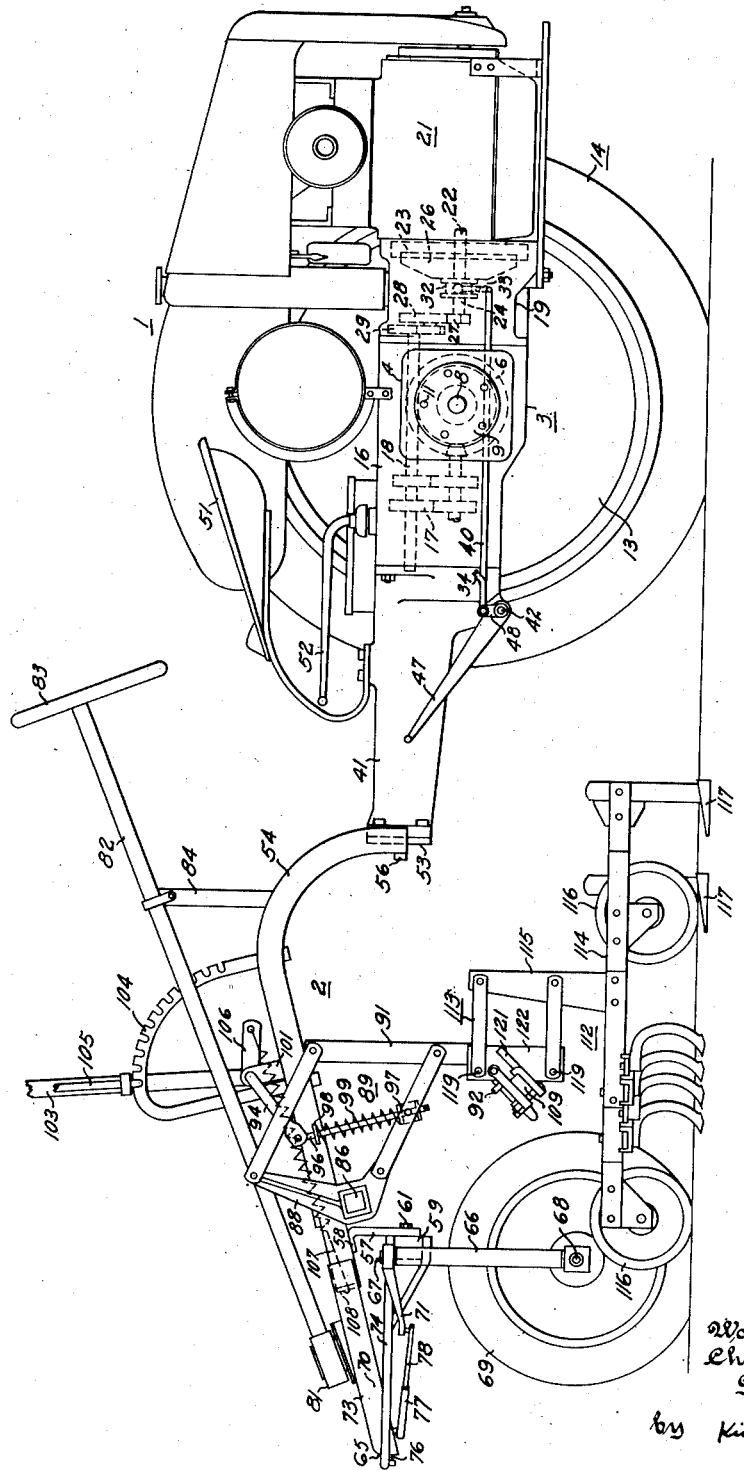
Fig. 1 is a side elevation of a tractor-implement combination embodying the invention with the near side front and rear wheels removed.
Figure 2:
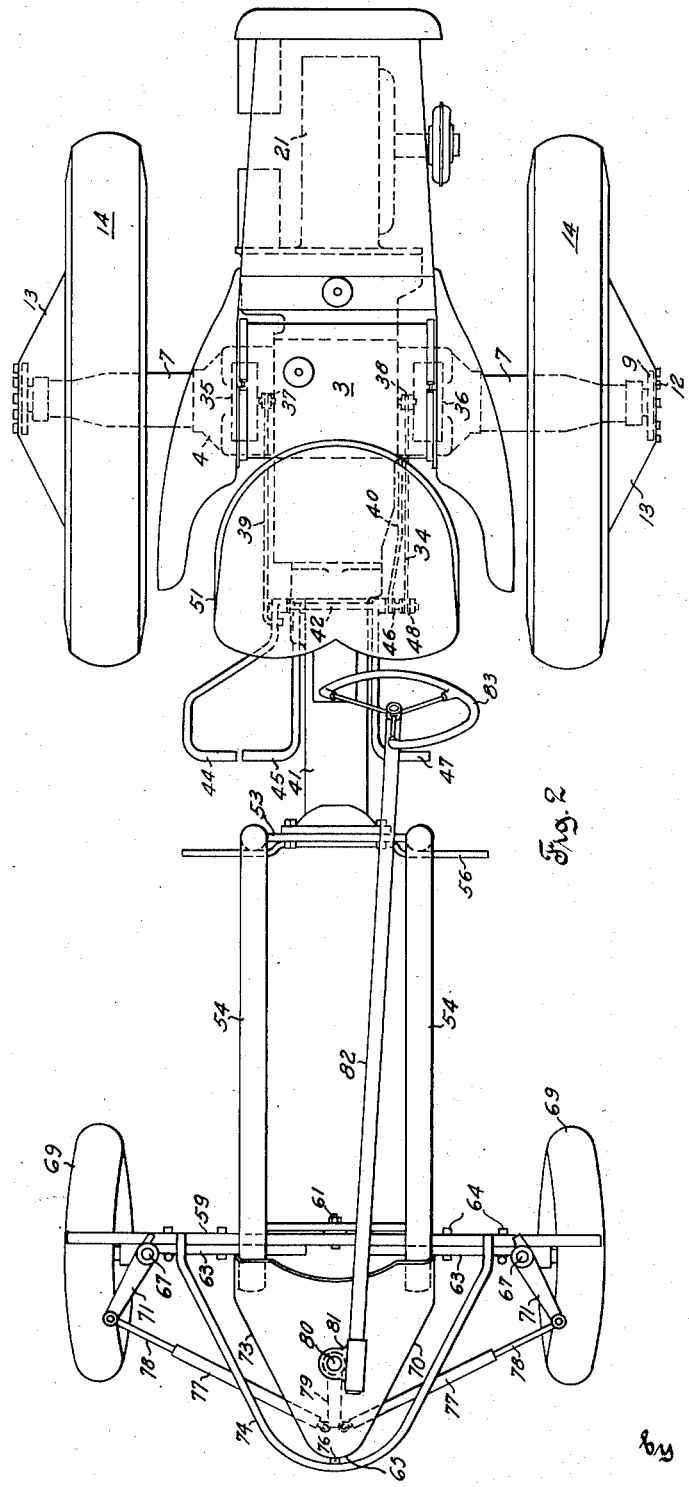
Fig. 2 is a plan view of the tractor shown in Fig. 1 with the implement supports and implement removed in order to better show the front end construction.

Referring to Figs. 1 and 2, it will be seen that a tractor constructed in accordance with the present invention may include a rear driving unit 1 and a forwardly extending frame structure 2. The rear driving unit 1 comprises a transverse axle housing 3 including an enlarged central portion 4 operatively enclosing a conventional differential drive mechanism 6 and including a pair of oppositely projecting axle shaft housings 7 each enclosing an axle shaft 8 having its inner end operatively connected with the differential mechanism. The outer or exposed end of each axle shaft terminates in a radially flanged hub portion 9 provided with a circular series of circumferentially spaced holes 11 through which are inserted bolts 12 fixedly attaching the central disc portion 13 of a driving wheel 14 thereto. The central portion 4 of the axle housing 3 includes an integral forwardly extending portion 16 operatively enclosing a change speed gearing 17 drivingly connected with the differential mechanism 6, this gearing including a power input shaft 18 extending rearwardly through the central portion of the axle housing 3 in overlying relation to the differential mechanism 6 therein and into the adjacent end of a clutch and flywheel housing 19 detachably bolted or otherwise rigidly secured to the rear side of the axle housing 3 in rearwardly extending relation thereto.

A conventional internal combustion engine power unit 21 is detachably bolted to the rear end of housing 19 and is thereby supported in rearwardly extending relation to the central portion 4 of the axle housing, the adjacent end of the engine crank shaft 22 entering housing 19 and having mounted thereon a combined flywheel and clutch element 23. An axially aligned shaft extension 24 mounts a shiftable clutch element 26 selectively engageable with a clutch element fixed to engine crankshaft 22 in a conventional manner (not shown), and shaft extension 24 has mounted on its end remote from the engine a gear 27 which meshes with suitable gearing 28 in housing 19. Gearing 28 in turn engages gear 29 positioned on the adjacent end of shaft 18 for rotation therewith thus operatively connecting shaft extension 24 in driving relation therewith. Power is transmitted through this power input shaft 18 to the change speed transmission 17 and thence through the differential mechanism 6 to the separate rear axle shafts 8 in a conventional manner (not shown). A clutch element shift collar 32 is provided with an arm 33 which extends through an opening in housing 19 and is operatively connected with the rear end of an actuating rod 40 which extends forwardly through a portion of the axle housing 3 and along the adjacent side of the forwardly extending portion 16 of the axle housing.

The central enlarged portion 4 of the axle housing 3 also encloses brake means 35 and 36 (Fig. 2) symmetrically arranged with respect to the longitudinal axis of the forwardly extending portion 16 enclosing the change speed gearing, there being a brake means positioned for association with each axle shaft 8 so as to control rotation thereof for braking and turning purposes as is common practice. Each brake means is provided with a separate actuating arm 37 and 38 operatively connected with a forward and downward extending actuating rod or link 39 and 34, these links being positioned adjacent opposite sides of the forwardly extending housing portion 16. A tubular stub frame member 41 is rigidly bolted or otherwise detachably secured to the forward end of axle housing portion 16 and projects forwardly therefrom on a horizontal level. A shaft 42 extends transversely through the lower rear portion of stub frame member 41 and is rotatably supported in suitable bearings (not shown) mounted in opposed wall portions thereof. Shaft 42 extends laterally beyond opposite sides of stub frame member 41 and one such projecting shaft portion mounts a pair of adjacent brake pedals 44 and 45 which extend forward and upward to a position adjacent the right side of the stub frame member as seen when looking forward from the rear axle structure. The other projecting shaft portion mounts a lever arm 46 fixed thereto and a clutch pedal 47 which extends forward and upward to a position on the opposite side of the stub frame member and in approximate lateral alignment with the brake pedals. The inner brake pedal 45 is fixed to shaft 42 for turning movement therewith and the outer brake pedal 44 is mounted on the shaft for turning movement relative thereto, the outer pedal being operatively connected with the forward end of the adjacent brake actuating link 39. The arm 48 fixed on the opposite end portion of shaft 42 is operatively connected with the forward end of the brake actuating link 34. Clutch pedal 47 is mounted on shaft 42 for turning movement relative thereto and is operatively connected with the adjacent forward end of the clutch actuating rod 40.

The rear top side portion of stub frame member 41 mounts an operator's station or seat 51 disposed in adjacent forward relation to the power unit 21 and in overlying relation with respect to the forwardly projecting axle housing portion 16. The change speed gearing 17 is provided with a suitable shift lever 52 which extends upward and outward to a point within easy reach of an operator seated at station 51. In addition, it should be noted that the legs of an operator seated at station 51 normally straddle the forward portion of the stub shaft member 41 with the operator's feet disposed for ready engagement with adjacent brake and clutch pedals 44, 45, and 47. A rigid transverse bracket 53 is bolted or otherwise detachably secured to the forward end of stub member 41 and a pair of similar tubular members 54 have their rear ends integrally united, as by welding, with opposite end portions of the bracket 53, these tubular members 54 arching upward abruptly to a higher level immediately in advance of stub member 41 and then extending forward and gradually downward, in generally parallel relation, to a level lower than said higher level. Preferably the forward end portions of tubular members 54 terminate at a level somewhat above the level of the top side of horizontal stub member 41 as is best seen in Fig. 1. For convenience, transverse bracket 53 may be provided with a foot rest bar 56 which extends laterally beyond the opposite sides thereof, this foot rest being also disposed for ready engagement by the feet of an operator seated at station 51.

Figure 4:
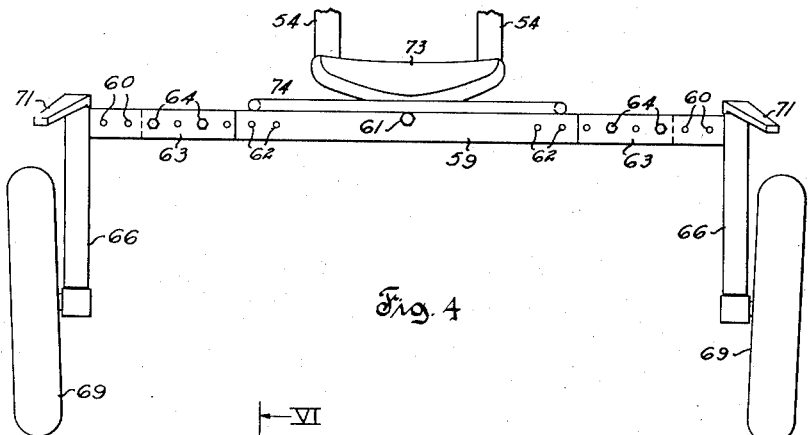
Fig. 4 is a front view of the forward axle structure with parts omitted to better show the tread spacing adjustment afforded thereby.

The forward end portions of tubular members 54 are rigidly united by a downwardly arched or bowed brace member 57 having its upper ends 58 shaped to conform with and receive underside portions of tubular members 54, these engaged portions of the brace and tubular members being integrally united as by suitable welds. A rigid transverse axle bar 59, rectangular in cross section, has a midportion thereof united with the midportion of depending brace member 57 by means of a bolt 61 affording relative pivoted movement of these parts about a horizontal longitudinal axis. Axle bar 59 projects equal distances laterally beyond the opposite sides of frame members 54 and has its opposite end portions provided with a series of longitudinally spaced holes 62 (see Fig. 4). A pair of rigid stub axle bars 63 are detachably adjustably secured to the forward side of the opposite end portions of axle bar 59 by means of bolts 64 passing through a pair of longitudinally spaced holes 60 in the stub bars selectively alignable with the series of holes 62 in the axle bar 59. The outer end of each stub bar 63 rigidly mounts a vertically depending shaft receiving and supporting tube or standard 66, and a shaft 67 is rotatably mounted in each standard, each shaft terminating at its lower end in a laterally projecting spindle 68 supporting a ground engaging wheel 69. The upper end of each shaft 67 is provided with a laterally projecting arm 71 adapted for connection with a steering mechanism.

The forward end portions of tubular members 54 are additionally braced by means of a rigid plate member 73 having its front and side edge portions turned down to provide depending front and side flanges 65 and 70, respectively, the opposed rear portions of the side flanges 70 being generally parallel and shaped to conform with and engage the opposed outside forward end portions of the tubular members 54, these parts being welded or otherwise rigidly united, as desired. This plate-like brace member 73 forms in effect a forward continuation of tubular frame members 54 which is disposed in overlying relation to the axle structure. Axle bar 59 is also additionally braced by means of a radius rod 74 having its midportion supported on a horizontal pivot mounting 76 carried by the front wall or flange 65 of plate-like brace member 73 and having opposite bifurcated end portions welded to upper and lower side edge portions of axle bar 59. The spindle arms 71 on wheel mounting shafts 67 are each connected, preferably by telescoping link elements 77 and 78, with a steering arm 79 on the lower end of a vertically extending shaft 80 rotatably supported in a suitable housing 81 mounted on plate-like brace member 73 in advance of and approximately midway between the forward end portions of frame members 54. The upper end of shaft 80 is gear connected with the forward end of a steering column inclosed shaft 82 which extends obliquely rearward and upward in approaching overlying relation to a tubular frame member 54 and to a point such that the steering wheel 83 on the rear end thereof is within easy reach of an operator seated at station 51. A rear portion of steering column 82 is supported on an upstanding post or bracket 84 carried by a rear portion of the underlying frame member 54.

Figure 3:
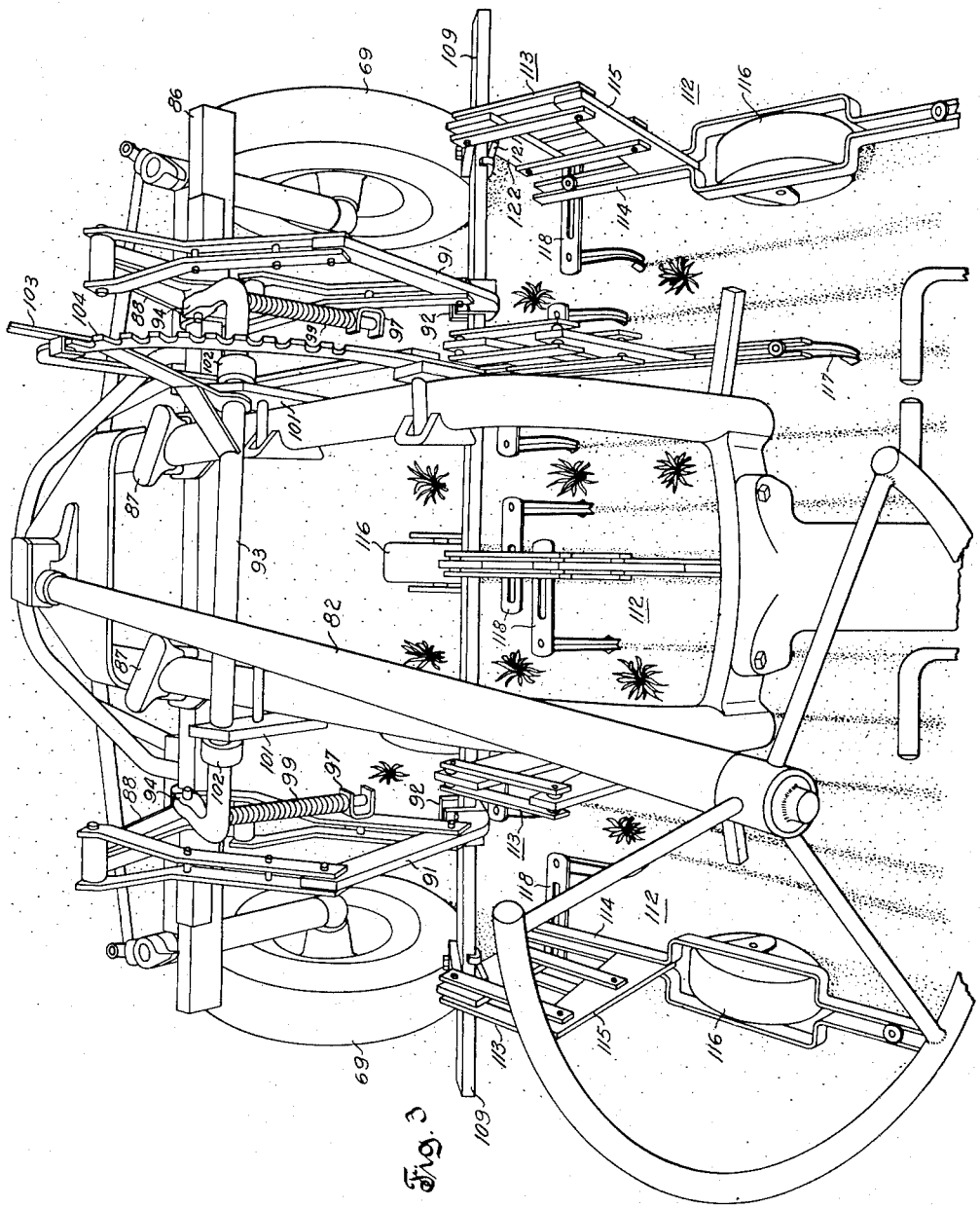
Fig. 3 is a perspective view of the forward portion of the tractor-implement combination shown in Fig. 1 as seen from the operator's station.

A transverse rigid cross bar 86 is detachably clamped to opposed underside portions of tubular frame members 54 by means of suitable connectors 87, cross bar 86 preferably extending equal distances laterally beyond the sides of frame members 54 as shown in Fig. 3. A pair of similar hangers 88 are suitably clamped or otherwise adjustably fixedly secured to opposite end portions of rectangular cross bar 86, these hangers being preferably arranged in symmetrical relation with respect to the longitudinal axis of the tractor. Each hanger supports a similar depending rearwardly extending parallel linkage 89 for vertical swinging movement about vertical spaced pivot axes generally parallel to the longitudinal axis of the cross bar. Each linkage includes a vertically disposed rear link 91 extending downward and forward beneath the lower one of the rearwardly extending links and the lower ends of these rear links 91 are provided with laterally aligned implement draft bar supports 92. Parallel linkages 89 are additionally supported for simultaneous vertical adjustment through means of a transverse rock shaft 93 having forwardly extending arms 94 pivotally connected with the upper end of a lift rod 96 which in turn is slidably pivotally connected with an intermediate portion of the adjacent lower link by means of a conventional connector 97. Rod 96 is provided with a spring seat 98 and is surrounded by a compression spring 99 having its lower end abutting the top side of connector 97 and having its upper end engaging spring seat 98.

Rock shaft 93 is rotatably supported in a pair of suitable brackets 101 detachably secured to and projecting above opposite top side portions of tubular frame members 54. Transverse movement of the rock shaft 93 relative to brackets 101 is prevented by a pair of collars 102 secured to the shaft in abutting relation to the outer side of each bracket 101 as clearly seen in Fig. 3. Actuation of rock shaft 93 is effected by means of a lever 103 fixed thereto and extending upward alongside a notched quadrant 104 fixedly carried by the adjacent frame member 54. Lever 103 is provided with a conventional quadrant engaging latch rod 105, and in this connection it should be understood that the upper portion of lever 103 (not shown) preferably extends rearward to a point within easy reach of an operator seated at station 51. The effort necessary to effect a lifting movement of lever 103 and of an implement attached to depending supports 92 may be greatly reduced by providing the rock shaft with a rearwardly extending arm 106 to which is secured the rear end of a balance spring 107 having its forward end connected with a bracket 108 secured to a forward portion of the frame structure as shown in Fig. 1.

The depending laterally aligned supports 92 detachably mount an implement comprising a rigid transverse draft bar element 109, rectangular in cross section, and a plurality of tool rigs 112 secured to the draft bar element for adjustment longitudinally thereof. Each rig comprises a parallel linkage 113 and a tool frame 114 having an upstanding rigid part 115 constituting the rear link of linkage 113. Each tool frame operatively mounts a gauge wheel 116, a rear tool 117 and one or more transverse laterally adjustable tool carrying bars 118. And in this connection, it will be noted that the tool frame disposed directly behind a front wheel has its gauge wheel disposed intermediate the ends thereof whereas the tool frames disposed between these wheels have their gauge wheels mounted on the front end thereof. It should also be noted that the tool rigs are supported for vertical swinging movement relative to the depending supports 92 and draft bar element 109 on laterally aligned vertically spaced pivot axes 119 disposed above and below the rig supports, and that a downward pivotal movement of the rig linkage relative to the depending supports is limited by engagement of the underside of the upper link with a projection 121 on the vertically disposed front link 122, which is fixedly secured to draft bar element 109. Consequently a lifting movement of lever 103 and thereby of supports 92, results, if sufficient, in the tool rigs 112 being raised clear of the ground and into a transport position, affording a ground clearance adequate for all practical purposes, the necessary clearance being provided by movement of rear links 115 on underslung rigs 112 upward into the space afforded by the upwardly arched rear portions of frame members 54.

It has been previously pointed out that the front axle structure affords a means for increment adjustment of the front wheel tread spacing to conform with any desired plant row spacing. In order to increase the utility of the tractor along this line it is necessary that there also be provided a means for correspondingly adjusting the rear wheel tread spacing so that the front and rear wheels may travel in longitudinally aligned relation between the same plant rows or in the same furrow. The illustrated embodiment of the present invention affords a means for varying the rear wheel tread spacing in a manner now to be described.

Figure 5:
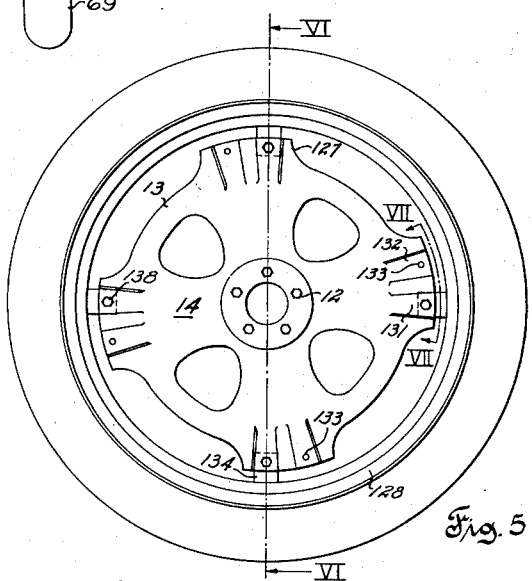
Fig. 5 is a side elevation of a rear traction wheel.
Figures 6, 7:
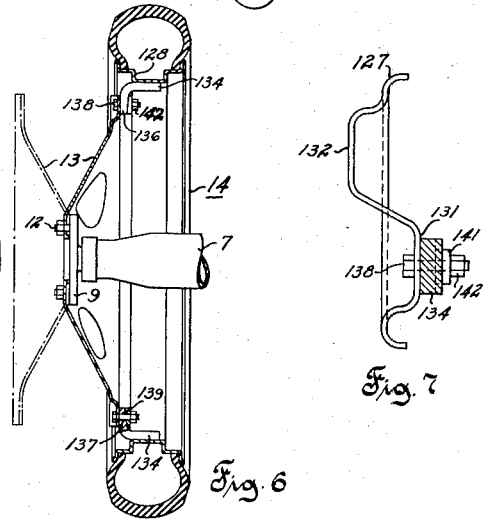
Fig. 6 is a section taken on line VI—VI of Fig. 5 with the addition of a dotted line showing the disc reversed on the hub.
Fig. 7 is a partial section taken on line VII—VII of Fig. 5.
Figure 8:
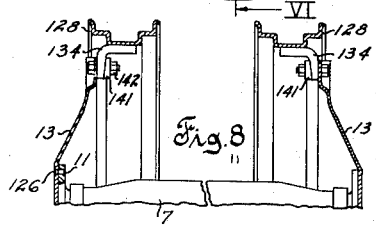
Figure 10:
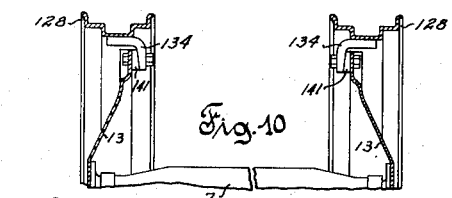

Referring to Figs. 5 and 6, it will be seen that the disc-like central portion 13 of rear wheel 14 (hereinafter called the disc) is dished and secured to the axle hub portion 9 with its concave surface facing the tractor, the central portion of the disc having a series of circumferentially spaced holes 126 (Fig. 8) therethrough similarly arranged and alignable with the holes 11 in hub portion 9 for receiving the securing bolts 12. And in this connection it should be noted that the disc may be attached to the axle with either side of the disc facing out as shown in Fig. 6. The periphery of the disc 13 has radially projecting portions 127 equally spaced circumferentially thereof, these portions hang detachably connected with and operatively supporting a tire mounting rim unit 128.

As may be seen in Fig. 7 these projecting portions 127 of disc 13 present a generally S-shaped configuration when viewed along an edge of the disc. That is, each projection presents a pair of oppositely facing flat surfaces 131 and 132 symmetrically offset with respect to a vertical plane normal to the axis of rotation of wheel 14, each offset surface having a bolt receiving opening or hole 133 therethrough. The rim unit 128 is of a conventional type (see Fig. 6) with lugs 134 spaced circumferentially along the inner surface thereof to conform with the spacing of the offset surfaces presented by disc projections 127, these lugs being preferably permanently fastened to the rim in any suitable manner. Each lug has a portion 136 thereof offset with respect to the center line of the rim, this portion projecting inward toward the center of the wheel, and being shaped to sideabut a selected one of the laterally offset disc surfaces. This projecting portion 136 of lug 134 has a bolt receiving opening 137 therethrough adapted for alignment with any one of the bolt receiving openings 133 in the offset disc surfaces and consequently to assemble the wheel the openings in the lugs are brought into alignment with the openings in one set of offset surfaces of the disc and a bolt 138 passed therethrough to rigidly fix the rim relative to the disc. It will be noted that the lug used in the illustrated embodiment of the present invention has an inclined surface 139 on one side of its projecting portion 136 and to compensate for this incline a spacer element 141 having an oppositely inclined surface is positioned between the lug and the nut 142 on the end of the bolt.

Figure 9:
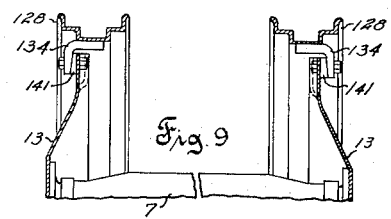
Figure 11:
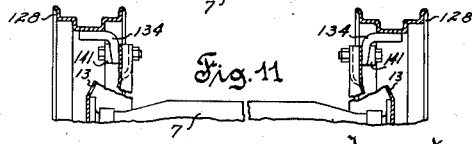

From the foregoing description of the wheel structure it will be seen that this construction affords a wide range of adjustment in tread spacing of the tractor rear wheels. For one tread spacing adjustment the rim and disc may be assembled as shown in Figs. 5 through 8 with the concave surface of the disc 13 facing toward the longitudinal center line of the tractor, with the rim 128 offset inwardly with respect to the disc, and with lug portions 136 fastened to the offset flat surfaces 131 of the disc on the side nearest the center line of the tractor. A second adjustment can be made by removing lug bolts 138, circumferentially rotating rim unit 128 in a counterclockwise direction, and then axially shifting the rim unit outwardly to a position where lug 136 abuts the outside face of the alternate disc surface 132, as shown in Fig. 9. A third adjustment is afforded by removing the lug bolts 138, reversing rim unit 128 so that the lug offset portion 136 faces outwardly with respect to the tractor center line, circumferentially rotating the rim unit 128 clockwise, and then axially shifting rim unit 128 inwardly with respect to the tractor center line to a position wherein the lug offset portion 136 abuts the inner face of disc offset surface 131, as pictured in Fig. 10. A fourth adjustment can be made by removing lug bolts 138, circumferentially rotating the rim unit 128 in a counterclockwise direction, and then axially shifting rim unit 128 outwardly to a position wherein lug portion 136 abuts the outer face of disc offset surface 132, as shown in Fig. 11. It being understood, of course, that it is necessary to jack-up the axle structure in the usual manner when making such adjustments.

In addition to the four adjustments just described it will be seen that further adjustment can be had for each of these positions by removing the lug bolts 138 and reversing the rim 128 relative to the disc 13 and replacing it on the same offset surface of the disc. At this point there has been provided eight increments of axial adjustment for each rear wheel, all afforded by shifting the rim relative to the disc. Looking now at Fig. 6 it will be seen that eight additional adjustments can be obtained by removing hub bolts 12 and reversing the disc 13 relative to axle hub portion 9, in each of the previously described combinations.

In all of the above described combinations for adjusting the rear wheel tread spacing the spacer element 141 is positioned with its inclined surface abutting the oppositely inclined surface 139 of the lug projecting portion on the rim. Therefore, it is obvious that a still greater number of variations in tread spacing can be achieved by using spacer elements having a different thickness than that shown in the drawings. This is an important feature in that it permits corresponding increment adjustment of the front and rear wheel tread spacing to conform with any desired plant row spacing so that the front and rear wheels can travel in longitudinally aligned relation between the same plant rows or in the same furrow.

Referring again to Fig. 1, it will be noted that the rear ends of the tool rigs disposed beneath the tractor terminate forwardly of the front end of stub frame member 41 and that therefore even if a tool rig be positioned in general alignment with the longitudinal center line of the tractor as shown in Fig. 3, the rigs may be lifted to a height affording adequate ground clearance for properly planting and cultivating row crops on the top surfaces of beds separated by furrows for the purpose of irrigating or draining the beds, as desired. And in this connection, it will also be noted that although the tractor herein disclosed affords adequate ground clearance for working bedded crops, it has a low overall height which is an important feature in that any increase in overall height, such as would be necessary to render conventional type tractors suitable for working bedded crops with tools mounted on the tractor in underslung relation beneath a forward portion thereof, invariably results in an increase in both weight and cost. Moreover, lateral stability and maneuverability both decrease as the overall height of a vehicle increases.

In addition, it should be noted that tool bars 118 are disposed generally along a transverse line directly behind and parallel to the front axle structure, that is, the tools are positioned in the area between and directly behind the front dirigible wheels so that the tools closely follow the steering movements of these wheels. Furthermore, it should also be noted (note Figs. 2 and 3) that insofar as the tractor and implement supports are concerned, an operator seated at station 51 is afforded a practically unrestricted close range view of the plant rows and tools along a line of sight directed sufficiently forward to obtain excellent steerability. These features are also important both separately and collectively in that implements or tools disposed ahead of a tractor a distance sufficient to insure good visibility invariably fail to respond quickly to steering movements of the front dirigible wheels and are therefore impractical for the complete cultivation of closely spaced plant rows, and in that it is impractical to steer any tractor with sufficient accuracy for efficiently effecting complete cultivation of closely spaced plant rows, even if the rows are straight, by looking downward toward the ground immediately in front of the operator's station.

The arched frame structure besides affording the advantages previously pointed out, also affords ample space for readily attaching or detaching implements to the depending laterally aligned supports 92 and ample space for readily adjusting, as desired, the tools and/or rigs carried by such supports. Moreover, this type of frame provides a simplified and extremely durable, light weight construction which contributes materially to a reduction in both initial and maintenance costs. In addition, it is to be noted that the entire forward portion of the tractor, including the dirigible wheel supported front axle structure and the steering means therefor, may be readily removed as a unit simply by removing the bolts securing bracket or brace member 53 to the forward end of stub frame member 41. And it should be noted that this separation of the front and rear tractor portions may be effected without disconnecting any of the controls for the driving unit.

Another feature contributing to the advantages hereinbefore pointed out is the positioning of the operator's station in adjacent overlying relation to a rear portion of stub frame member 41 so that the legs of an operator seated at the station normally straddle member 41 as this feature materially lowers the center of gravity and directs the operator's line of vision when looking toward the ground directly behind and between the front dirigible wheels sufficiently forward to obtain excellent steerability. In addition, this arrangement permits locating the foot pedal controls in readily accessible relation to the operator's feet so that these controls may be actuated, as desired, without the operator looking away from the plant rows and/or tools. Furthermore, the location of the operator's station in adjacent forward relation to the power unit and transmission also permits positioning the usual controls therefor for ready actuation by an operator seated at the station without in any manner affecting steerability.

Some of the features pointed out as affording particular advantages have particular utility in the construction and operation of small light weight farm tractors while other of the features are of more general application. And it should therefore be understood that it is not intended to limit the invention to the exact construction herein shown and described for purposes of illustration, as various modifications within the scope of the appended claims may occur to persons skilled in the art.

It is claimed and desired to secure by Letters Patent:

1. In a farm tractor having a rear driving unit including a housing structure mounting a traction means supporting same, and including an engine carried by a rear portion of said housing structure and drivingly connected with said traction means, the combination comprising a stub frame member extending forward from a central portion of said housing structure on a horizontal level, a pair of spaced frame members having rear end portions thereof rigidly united with the forward end of said stub member in laterally spaced symmetrical relation thereto, said pair of members extending forward from said stub member in generally parallel relation, means rigidly uniting forward end portions of said pair of members and including a supporting dirigible wheel structure disposed therebeneath, an operator's station mounted on said tractor in overlying relation to a rear portion of said stub member so that an operator seated at said station may look forward and downward between said pair of frame members and thereby obtain a practically unrestricted close range view of all of the ground underlying the portion of the tractor in advance of said stub portion, and a steering shaft having its forward end supported on said last mentioned means forwardly of and between the forward end portions of said pair of frame members and having its forward end in general longitudinal alignment with said stub member, said steering shaft being operatively connected with said dirigible wheel structure and extending obliquely rearward and upward from said means in approaching overlying relation to one of said pair of frame members and to a point within easy reach of an operator seated at said station so as to be clear of the operator's line of vision when looking forward and downward between said members.

2. In a farm tractor having a rear driving unit including an axle structure, a pair of drive wheels mounted on opposite end portions of said axle structure, and including an engine carried by a rear portion of said rear axle structure and drivingly connected with said wheels, the combination comprising a stub frame member extending forward from said axle structure on a horizontal level, a second frame member arching upward abruptly from said stub member to a higher level in advance thereof and then extending forward and downward to a level below said higher level, means fixedly united with a forward end portion of said second member and including a supporting dirigible wheel structure disposed therebeneath, an operator's station mounted on said tractor in advance of said engine and in overlying adjacent relation with respect to a rear portion of said stub frame member so that the legs of an operator seated at said station normally straddle the forward portion of said stub frame member.

3. In a farm tractor having a rear driving unit including a transverse axle structure mounting a drive wheel at each end thereof, an engine carried by a rear portion of said axle structure and drivingly connected with said wheels, and including forwardly extending laterally spaced clutch and brake pedal means controlling the transmission of power to said wheels, the combination comprising a stub frame member extending forward from said axle structure on a horizontal level between said clutch and brake pedal means in proximate relation thereto, a second frame member arching upward from said stub member in advance of said pedal means and to a higher level in advance thereof and then extending forward and downward to a level below said higher level, means fixedly united with a forward end portion of said second member and including a supporting dirigible wheel structure disposed therebeneath, and an operator's station mounted on said tractor in overlying adjacent relation to a rear portion of said stub member so that the legs of an operator seated at said station normally straddle a forward portion of said stub member with the operator's feet disposed for ready engagement with said pedal means.

4. In a farm tractor having a rear driving unit including a transverse axle structure mounting a drive wheel at each end thereof and enclosing a differential mechanism operatively connected with said wheels, an engine carried by said axle structure, a change speed gearing operatively connecting said engine with said differential mechanism, a forwardly extending clutch pedal controlling the transmission of power from said engine to said change speed gearing, a brake means operatively associated with each of said drive wheels, and including a forwardly extending brake pedal disposed in laterally spaced and generally aligned relation with respect to said clutch pedal, the combination comprising a stub frame member extending forward from said axle structure on a horizontal level between said clutch and brake pedals in proximate relation thereto, a second frame member arching upward from said stub member in advance of said brake and clutch pedals to a higher level in advance thereof and then extending forward and downward to a level below said higher level, means fixedly united with a forward end portion of said second member and including a supporting dirigible wheel structure disposed therebeneath, and an operator's station mounted on said tractor in adjacent overlying relation to a rear portion of said stub member so that the legs of an operator seated at said station normally straddle a forward portion of said stub member with the operator's feet disposed for ready engagement with said pedals.

5. In a farm tractor having a rear driving unit including a wide axle structure, a pair of drive wheels mounted on opposite end portions of said axle structure, and including an engine carried by said axle structure in rearwardly extending relation thereto and drivingly connected with said wheels, an elongated rigid frame structure extending for a first part of its length forwardly from a central portion of said axle structure on a horizontal level and having a second part arching upward from said first part to a higher level in advance thereof and then extending forward and downward to a level below said higher level, an operator's station mounted on said horizontal frame part in advance of said engine and rearwardly of said second frame part so that the legs of an operator seated at said station normally straddle the forward portion of said horizontal frame part, a rigid transverse front axle structure united with a forward end portion of said second part and extending laterally beyond the opposite sides thereof, and a pair of dirigible supporting wheels mounted on opposite end portions of said front axle structure.

6. In a farm tractor having a rear driving unit including a housing structure mounting a traction means supporting same, and including an engine carried by said housing structure in rearwardly extending relation thereto and drivingly connected with said traction means, the combination comprising a stub frame member extending forward from said housing structure on a horizontal level, an operator's station mounted on a rear portion of said stub frame member in advance of said engine so that the legs of an operator seated at said station normally straddle the forward portion of said stub member, a pair of spaced frame members having rear end portions thereof rigidly united with the forward end of said stub member in laterally spaced relation with respect to opposite sides thereof, said pair of members arching upward to a higher level in advance of said stub member and terminating in forward end portions disposed at a level below said higher level, and means rigidly uniting the forward end portions of said pair of members and including a supporting dirigible wheel structure disposed therebeneath.

7. In a farm tractor having a rear driving unit including a housing structure mounting a traction means supporting same, and including an engine carried by said housing structure in rearwardly extending relation thereto and drivingly connected with said traction means, the combination comprising a pair of laterally spaced frame members having rear end portions thereof rigidly connected with the forward side of said housing structure, said pair of members arching upward to a higher level in advance of said housing structure and terminating in forward end portions disposed at a level below said higher level, an operator's station mounted on said tractor between the engine and the rear end of said laterally spaced frame members in adjacent overlying relation to the housing structure, and means rigidly uniting the forward end portions of said pair of members and including a supporting dirigible wheel structure disposed therebeneath.

8. In a tractor having a rear driving unit including a wide axle structure, a pair of drive wheels mounted on opposite end portions of said axle structure, and including a power unit carried by said axle structure in rearwardly extending relation thereto and drivingly connected with said wheels, the combination comprising a stub frame extending forwardly from said axle structure on a horizontal level approximately the same as the level of the axis of rotation of said drive wheels, a pair of spaced rigid frame members having rear end portions thereof fixedly secured to the forward end of said stub frame in laterally spaced relation to opposite sides thereof, said pair of members arching upward abruptly to a higher level and then extending forward and gradually downward to a level below said higher level, means rigidly uniting opposite forward end portions of said pair of members and including a wide front axle structure projecting laterally beyond the opposite sides thereof, a pair of dirigible wheels extending from and supporting opposite end portions of said front axle structure, and an operator's station mounted on said tractor between said drive wheels and in adjacent overlying relation to a rear portion of said stub frame so that the legs of an operator seated at said station straddle a forward portion of said stub frame member and so that the operator may look forward and downward between said pair of frame members and thereby obtain a practically unrestricted close range view of the ground directly behind and between said dirigible front wheels.

9. In a tractor having a rear driving unit including a wide axle structure, a pair of drive wheels mounted on opposite end portions of said axle structure, and including a power unit carried by said axle structure in rearwardly extending relation thereto and drivingly connected with said wheels, the combination comprising a stub frame extending forwardly from said axle structure on a horizontal level approximately the same as the level of the axis of rotation of said drive wheels, a pair of spaced rigid frame members having rear end portions thereof fixedly secured to the forward end of said stub frame in laterally spaced relation to opposite sides thereof, said pair of members arching upward abruptly to a higher level and then extending forward and gradually downward to a level below said higher level, means rigidly uniting opposite forward end portions of said pair of members and including a wide front axle structure projecting laterally beyond the opposite sides thereof, a pair of dirigible wheels extending from and supporting opposite end portions of said front axle structure, an operator's station mounted on said tractor between said drive wheels and in adjacent overlying relation to a rear portion of said stub frame so that the legs of an operator seated at said station straddle a forward portion of said stub frame member and so that the operator may look forward and downward between said pair of frame members and thereby obtain a practically unrestricted close range view of the ground directly behind and between said dirigible front wheels, a steering shaft having a forward end carried by said means and operatively connected with said dirigible wheels, said shaft extending obliquely rearward and upward in approaching overlying relation to one of said pair of members and to a point within easy reach of an operator seated at said station to thereby position said shaft clear of the operator's line of vision when looking forward and downward between said arched members, and a support for said steering shaft carried by the rear portion of one of the underlying frame members.

10. In a farm tractor having a rear driving unit including a housing structure mounting a traction means supporting same, and including an engine carried by said housing structure in rearwardly extending relation thereto and drivingly connected with said traction means, the combination comprising a stub frame member extending forward from a portion of said housing structure on a horizontal level, a pair of spaced frame members having rear end portions thereof rigidly united with the forward end of said stub member, said pair of members extending forward from said stub member in generally parallel relation, means rigidly uniting forward end portions of said pair of members and including a supporting dirigible wheel structure disposed therebeneath, and an operator's station mounted on said tractor in adjacent overlying relation to said stub member so that an operator seated at said station may look forward and downward between said pair of frame members and thereby obtain a practically unrestricted close range view of the ground underlying the portion of the tractor in advance of said stub frame member.

11. In a farm tractor having a rear driving unit including a housing structure mounting a traction means supporting same, and including an engine carried by said housing structure in rearwardly extending relation thereto and drivingly connected with said traction means, the combination comprising a stub frame member extending forward from a central portion of said housing structure on a horizontal level, a pair of spaced frame members having rear end portions thereof rigidly united with the forward end of said stub member in laterally spaced symmetrical relation thereto, said pair of members extending forward from said stub member in generally parallel relation, means rigidly uniting forward end portions of said pair of members and including a wide transverse front axle structure having a dirigible wheel supporting standard rigidly secured to opposite ends of said axle structure in depending relation thereto, a front wheel dirigibly supported by each standard in depending relation thereto, and an operator's station mounted on said tractor in advance of said engine and in overlying relation to said stub member so that an operator seated at said station may look forward and downward between said pair of frame members and thereby obtain a practically unrestricted close range view of the ground underlying the portion of the tractor in advance of said stub frame member.

12. In a farm tractor having a rear driving unit including a housing structure mounting a traction means supporting same, and including an engine carried by said housing structure in rearwardy extending relation thereto and drivingly connected with said traction means, the combination comprising a pair of laterally spaced frame members having rear end portions thereof rigidly connected with the forward side of said housing structure, said pair of members arching upward to a higher level in advance of said housing structure and terminating in forward end portions disposed at a level below said higher level, an operator's station mounted on said tractor between the engine and the rear end of said laterally spaced frame members in adjacent overlying relation to the housing structure, means rigidly uniting the forward end portions of said pair of members and including a supporting dirigible wheel structure disposed therebeneath, a steering means operatively connected with said dirigible wheels and including a shaft extending obliquely rearward and upward from adjacent said means in approaching overlying relation to one of said pair of members and to a point within easy reach of an operator seated at said station to thereby position said shaft clear of the operator's line of vision when looking forward and downward between said arched members.

13. In a farm tractor having a rear driving unit including a housing structure mounting a traction means supporting same, including an engine carried by said housing structure in rearwardly extending relation thereto and drivingly connected with said traction means, and including forwardly extending laterally spaced clutch and brake pedal means controlling the transmission of power to said wheels, the combination comprising a pair of laterally spaced frame members having rear end portions thereof rigidly connected with the forward side of said housing structure and in adjacent relation to said pedal means, said pair of members arching upward to a higher level in advance of said housing structure and terminating in forward end portions disposed at a level below said higher level, an operator's station mounted on said tractor between the engine and the rear end of said laterally spaced frame members in adjacent overlying relation to the housing structure so that the feet of an operator seated at said station are normally disposed for ready engagement with said pedal means, and means rigidly uniting the forward end portions of said pair of members and including a supporting dirigible wheel structure disposed therebeneath.

14. In a farm tractor having a rear driving unit including a housing structure mounting a traction means supporting same, including an engine carried by said housing structure in rearwardly extending relation thereto and drivingly connected with said traction means, and including forwardly extending laterally spaced clutch and brake pedal means controlling the transmission of power to said wheels, the combination comprising a pair of laterally spaced frame members having rear end portions thereof rigidly connected with the forward side of said housing structure in adjacent relation to said pedal means, said pair of members arching upward to a higher level in advance of said housing structure and terminating in forward end portions disposed at a level below said higher level, an operator's station mounted on said tractor between the engine and the rear end of said laterally spaced frame members in adjacent overlying relation to the housing structure so that the feet of an operator seated at said station are normally disposed for ready engagement with said pedal means, means rigidly uniting the forward end portions of said pair of members and including a supporting dirigible wheel structure disposed therebeneath, a steering means operatively connected with said dirigible wheels and including a shaft extending obliquely rearward and upward from adjacent said means in approaching overlying relation to one of said pair of members and to a point within easy reach of an operator seated at said station to thereby position said shaft clear of the operator's line of vision when looking forward and downward between said arched members.

WALTER F. STREHLOW.
CHARLES T. O'HARROW.
GEORGE W. PARK.

REFERENCES CITED

The following references are of record in the file of this patent:

UNITED STATES PATENTS

| Number | Name | Date |
|---|---|---|
| 1,566,229 | Scanlan | Dec. 15, 1925 |
| 1,782,992 | Johnson | Nov. 25, 1930 |
| 2,066,666 | Becker | Jan. 5, 1937 |
| 2,074,685 | Engstrom | Mar. 23, 1937 |
| 2,275,897 | Gifford | Mar. 10, 1942 |
| 2,287,438 | Lindsay | June 23, 1942 |
| 2,378,615 | Brown | June 19, 1945 |
| 2,385,690 | Sklovsky et al. | Aug. 28, 1945 |